United States Patent [19]
Stole et al.

[11] Patent Number: 6,091,578
[45] Date of Patent: Jul. 18, 2000

[54] DISK DRIVE ACTUATOR COMPONENTS MADE OF COMPOSITE MATERIAL INCLUDING FIBERS

[75] Inventors: Scott M. Stole, Waconia; James M. Adley, Hutchinson, both of Minn.

[73] Assignee: Questek Innovations, Inc., Waconia, Minn.

[21] Appl. No.: 08/912,874

[22] Filed: Aug. 15, 1997

[51] Int. Cl.⁷ ...................................................... G11B 5/55
[52] U.S. Cl. .............................................................. 360/106
[58] Field of Search ................................. 360/104, 106, 360/109; 310/311, 316, 317, 320, 321, 323, 325, 326, 327, 328, 330–333; 369/244, 247, 248

[56] References Cited

U.S. PATENT DOCUMENTS

| | | | |
|---|---|---|---|
| 3,918,722 | 11/1975 | Nakajima et al. | 369/247 |
| 5,140,482 | 8/1992 | Kimura et al. | 360/104 |
| 5,283,704 | 2/1994 | Reidenbach | 360/104 |
| 5,333,003 | 7/1994 | Archer | 343/914 |
| 5,424,596 | 6/1995 | Mendenhall et al. | 310/328 |
| 5,627,701 | 5/1997 | Misso et al. | 360/106 |

FOREIGN PATENT DOCUMENTS

| | | |
|---|---|---|
| 0324966 | 7/1989 | European Pat. Off. . |
| 0771001 | 5/1997 | European Pat. Off. . |
| 61-104376 | 5/1986 | Japan . |
| 08212741 | 8/1996 | Japan . |
| WO95/00467 | 1/1995 | WIPO . |

Primary Examiner—George J. Letscher
Attorney, Agent, or Firm—Schwegman, Lundberg, Woessner & Kluth, P.A.

[57] ABSTRACT

A disk drive system includes a base, a disk rotatably attached to the base, and an actuator assembly movably attached to the base. The actuator assembly moves the transducer to selected areas of the disk where information representative of data is to be written or read. The actuator assembly maintains the transducer in a transducing relationship with the disk. The actuator assembly also includes an arm which has a first layer of material including a plurality of elongated fibers orientated in a first direction, and a second layer of material including a plurality of elongated fibers orientated in a second direction. The first and second layers are part of a composite material. The transducer is attached to said arm. The resulting actuator arm has a resonant frequency that can be varied or moved or shifted by varying the direction of the elongated fibers in the second layer with respect to the direction of the elongated fibers in the first layer. The resonant frequency is varied so that it is at a different frequency than the resonant frequency peaks associated with the other components of the disk drive, such as the resonance frequency of the disk or disks of the drive and the head suspension assembly (HSA). The arm may also include signal-carrying wires which are positioned between the layers of the composite arm and heat conductive fibers to remove heat from a heat producing source, such as from a chip on the arm.

24 Claims, 9 Drawing Sheets

DISK DRIVE ACTUATOR COMPONENTS MADE OF COMPOSITE MATERIAL INCLUDING FIBERS

FIELD OF THE INVENTION

The present invention relates to the field of mass storage devices called disk drives. More particularly, this invention relates to a method and apparatus for making an arm for an actuator, or an actuator from a fiber composite material.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high RPM. These days common rotational speeds are 5100 and 7200 RPM. Rotational speeds of 10,000 RPM and higher are contemplated for the future. At such speeds, the very small ceramic block flies on a very thin layer of gas or air. In operation, the distance between the small ceramic block and the disk is very small. Currently "fly" heights are about 0.0003 mm. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

The actuator assembly is composed of many parts that contribute to the performance required to accurately hold the read/write head in the proper position. An actuator includes a pivot assembly, an arm, a voice coil yoke assembly and a head gimbal suspension assembly. A suspension or load beam is part of the head gimbal suspension assembly. One end of the suspension is attached to the actuator arm. The read/write head is found attached to the other end of the suspension. One end of the actuator arm is coupled to a pivot assembly. The pivot assembly is in turn connected to a servo motor system through the voice coil yoke. The other end is attached to the head gimbal suspension assembly. The head gimbal suspension assembly allows the read/write head to gimbal for pitch and roll to follow the topography of the imperfect memory disk surface. The head gimbal assembly also restricts motion with respect to the radial and circumferential directions of the memory disk. The suspension is coupled to the actuator arm as part of the mounting support holding the pivot support and coupled to the servo motor. Currently, the pivot assembly is mounted within an opening in a unitized E-block. The E-block includes arms for mounting the suspension on one end and a voice coil yoke on the other end. U.S. Pat. No. 5,283,704 issued to Reidenbach illustrates another actuator system composed of individual components instead of the unitized E-block. This actuator system is "built up" from an actuator arm, spacer rings, a separate voice coil yoke frame assembly, and a separate bearing cartridge. A voice coil is located on the voice coil yoke. The voice coil and magnets attached to the housing of the disk drive form a voice coil motor. The disk drive includes a feedback control loop to enable accurate positioning of the transducer. The disk drive system sends control signals to the voice coil motor to move the actuator arm and the suspension supporting the read/write head across the memory disk in a radial direction to the target track. The control signals indicate to the motor the magnitude and direction of the displacement. The control signals can also be used to maintain the position of the read/write head or transducer over a particular track.

Actuator arms act as spring-mass-damper systems and have resonant frequencies that can degrade the performance of the servo system. Every closed loop servo motor system has a predetermined bandwidth in which resonances occurring within the bandwidth degrade the performance of the servo motor system. The actuator arm is one key source of unwanted resonances. Accordingly, the bandwidths of most servo motor systems are designed such that resonances of the actuator arm occur outside the bandwidth. Each actuator arm has a unique resonance characteristic. Current actuator arms are made of stainless steel, aluminum or magnesium. Suspensions are typically made of stainless steel. The resonance characteristics of the arm are such that the bending modes and torsion modes have frequencies that are within the same frequency range as the suspension and the magnetic storage disk (1 KHz to 8 KHz). Great care must be used when designing an actuator system to prevent alignment of resonance modes from different disk drive parts that would create very high gains and an unstable servo performance.

In other words, in the presence of a resonance, the transducer or read/write head will vibrate causing it to pass across the desired track. When the resonances of the disk and suspension align or are about the same frequency, the frequency response is amplified so that the amplitude of the vibration is higher and the read/write head travels farther away from the desired track during the track crossings.

Stainless steel or metal arms could be made thicker to increase the bending and torsion mode frequencies, but the greater mass significantly degrades the performance of the actuator assembly by increasing the moment of inertia of the arm. Inertial increase will decrease the access time to transition between data tracks and increase the current requirements necessary to move the voice coil motor. Increased current results in increased heat within the disk enclosure and increased power requirements.

A thicker steel will also result in a higher mass assembly that will cause significant degradation of shock resistance of the disk drive system. Higher mass assemblies also imply less stability in the form of head lift-off. When a large shock impulse in the vertical direction is applied to the actuator arm, the head gimbal assembly "lifts off" and lands back on the disk surface. This damages the memory disk. Other metals such as aluminum have been used, but the key parameter determining the resonance characteristics of the actuator arm is the stiffness-to-mass ratio of the material, which is about the same for aluminum and stainless steel. Of currently available materials that have been used as actuator arms, only beryllium and ceramics have significantly higher stiffness-to-mass ratios over that of currently used stainless steel or aluminum. Beryllium is quite expensive and difficult to process while ceramics are prone to crack, particularly under shock load conditions. As a result, these materials have not become market acceptable.

The demand for greater track density is increasing steadily, so increasing the performance of the actuator assembly by lowering the mass and increasing the resonance frequencies is becoming a requirement for future systems. There is also a need for a disk drive system with lower access times. Furthermore, there is a need for a more stiff actuator arm. There is also a need for an actuator arm where the stiffness can be controlled in various directions so that the resonances can be changed to frequencies other than the resonant frequencies of other components of the disk drive.

SUMMARY OF THE INVENTION

A disk drive system includes a base, a disk rotatably attached to the base, and an actuator assembly movably attached to the base. The actuator assembly moves the transducer to selected areas of the disk where information representative of data is to be written or read. The actuator assembly maintains the transducer in a transducing relationship with the disk. The actuator assembly also includes an arm which has a first layer of material including a plurality of elongated fibers orientated in a first direction, and a second layer of material including a plurality of elongated fibers orientated in a second direction. The first and second layers are composed of a composite material. The transducer is attached to said arm. The transducer may be attached to the arm through the head gimbal suspension assembly. The resulting actuator arm has vibrational modes with a movable or shiftable resonant frequency. The resonant frequency can be varied or shifted by varying the direction of the elongated fibers in the second layer with respect to the direction of the elongated fibers in the first layer. The resonant frequency is varied so that it is at a different frequency than the resonant frequencies of other components of the disk drive, such as the resonance frequency of the disk stack (the disk or disks of the drive). The arm may also include signal carrying wires which are positioned between the layers of the composite arm or within a single layer of the composite arm.

The invention also contemplates a method for selecting the resonances of a disk drive system. The method includes the steps of orienting a first layer of material having a plurality of substantially parallel fibers in a first direction, and orienting a second layer of material having a plurality of substantially parallel fibers in a second direction so that the elongated fibers of the first layer and the elongated fibers of the second layer make an angle with respect to one another. An actuator arm including said first and second layers of material is then formed. The angle between the fibers of the first and second layer is selected after determining the resonant frequency of one or more of the major components of the disk drive, such as the resonant frequency of the rotating disk and the resonant frequency of the head suspension assembly. The angle between the fibers in the second layer and the fibers in the first layer are selected to produce a resonant frequency of the arm that differs from the resonant frequency of the one or more of the major components of the disk drive.

Advantageously, a lower mass actuator arm is produced in which the resonant frequency of the actuator arms can be shifted to a selected resonant frequency. The amplitude of the resonant frequency can also be controlled. The actuator arm allows for greater track density and increased performance. Lower access times are also achievable with this system. Advantageously, the actuator arm is lighter and stiffer such that the resonant frequencies are shifted to the higher end of the frequency spectrum when compared to current steel or metal actuator arms. The stiffness of the arm can also be controlled in various directions so that the resonances can be changed to frequencies other than the resonant frequencies of other components of the disk. An additional advantage is that the lighter actuator arm has increased shock resistance. The increased shock resistance yields a more robust drive.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
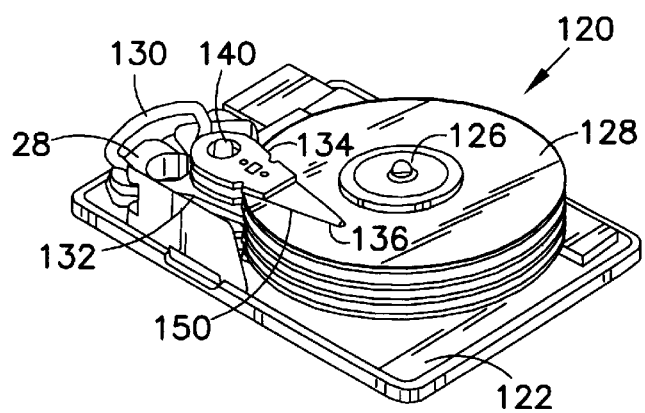
FIG. 1 is an isometric view of a disk drive having a rotating disk, an actuator, and an arm made of a composite material.
Figure 2:
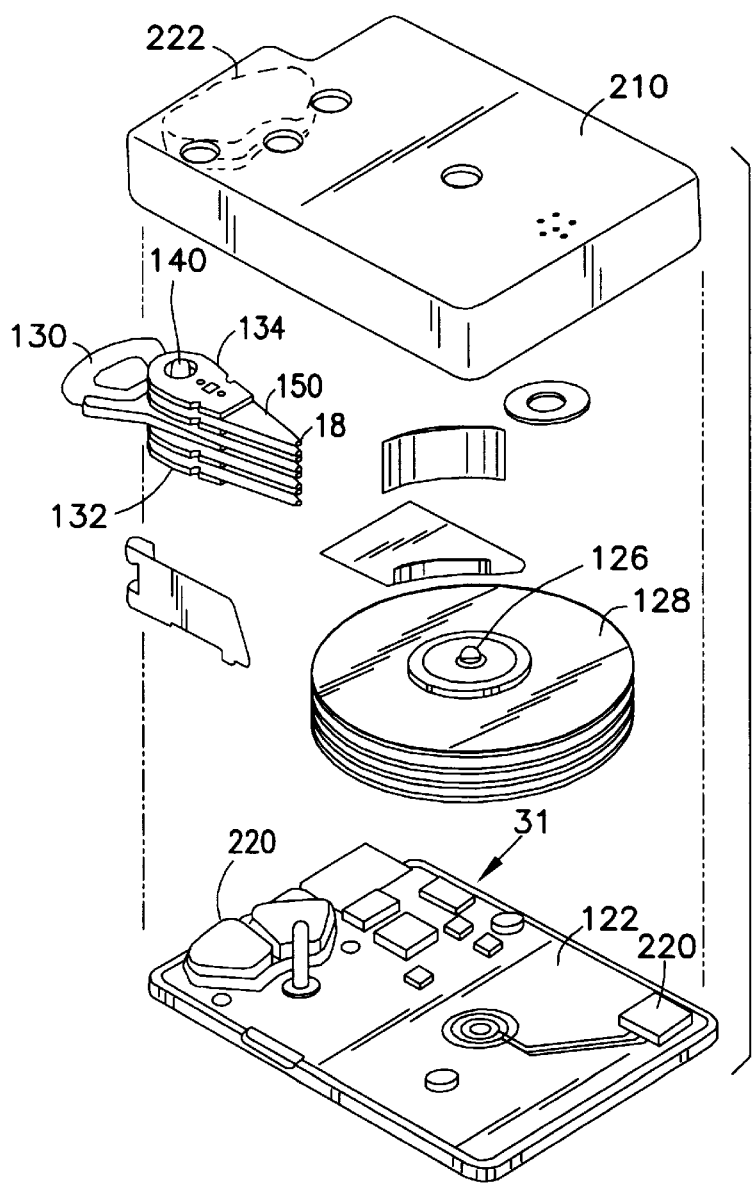
FIG. 2 is an exploded isometric view of a disk drive having a rotating disk, an actuator, and an arm made of a composite material.

Referring to FIGS. 1 and 2, the principal electrical and mechanical components of a disk drive constructed in accordance with a preferred embodiment of the present invention are illustrated. The disk drive includes a head/disk assembly ("HDA") 120 which includes a base 122 and a cover 210 (shown in FIG. 2). Attached to the base 122 is a spindle with an attached hub 126. Attached to the spindle with an attached hub 126 is a disk 128. Also attached to the base is a spindle motor for rotating the spindle with an attached hub 126 and the disk 128. Spindle motor driver circuitry 220 controls the current passing through the spindle motor to produce a torque and controllably rotate the hub and disk 128 attached to the spindle. An actuator assembly 132 is also attached to the base 122. The actuator assembly 132 includes arms 134 and suspensions 150 which carry transducers 136 in transducing relation to the disk 128. The arms 134 are attached to a pivot apparatus, such as a bearing cartridge 140. Attached to the arms 134 are the suspensions 150. The transducers 136 are encapsulated within or supported by a slider or small ceramic block mounted to the suspension. The slider carries the transducer over the disk. The other end of the actuator assembly 132 includes a portion of an actuator motor 130. The portion of the actuator motor shown attached to the actuator assembly 132 is the voice coil. The actuator motor, formed of the voice coil and magnets 220 and 222 (shown in phantom), is used to move the actuator assembly 132 and, more specifically, the transducers 136, also commonly referred to as read/write heads, to different radial positions relative to one or more surfaces of the disk 128.

Figure 3:
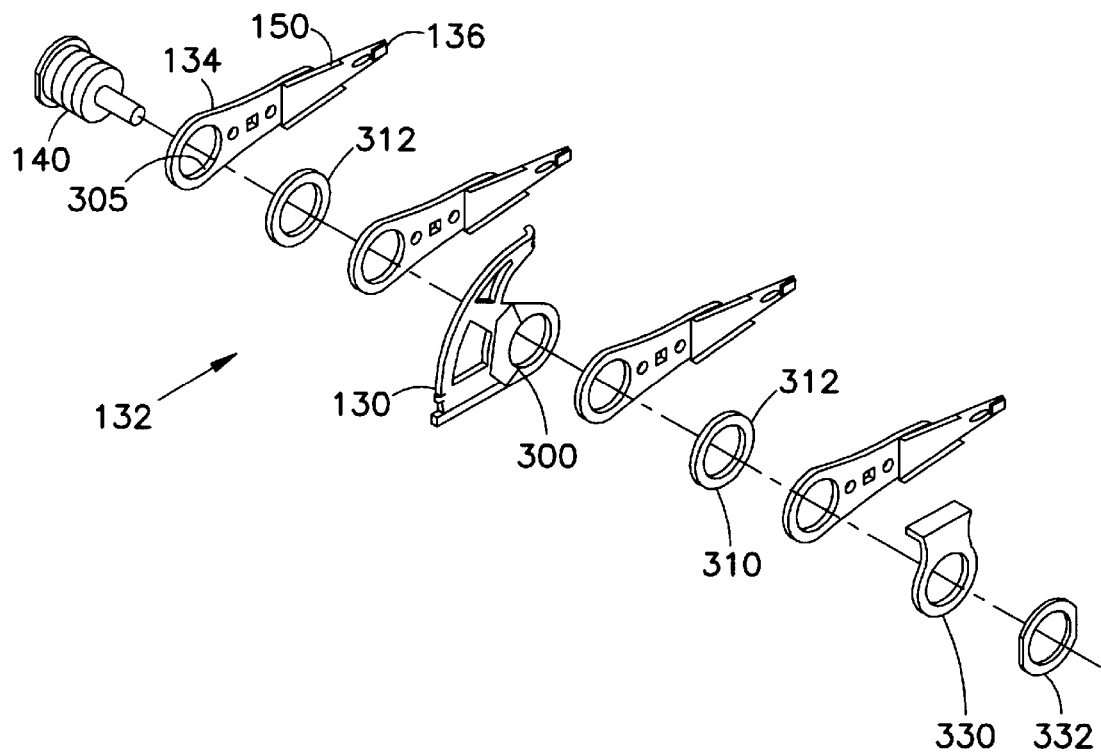
FIG. 3 is an exploded isometric view of an actuator assembly.

FIG. 3 is an exploded isometric view of an actuator assembly 132. The actuator assembly 132 includes a number of arms 134 having suspensions 150 attached to each of the arms. Attached to each of the suspensions 150 is a transducer 136. Although four arms are shown in FIG. 3, only one is labeled with reference numerals since they are all substantially identical. The arm 134 has an opening 305 therein. The opening 305 fits over the outside diameter of the bearing cartridge 140. Several spacers 310 and 312 are also included in the actuator assembly 132. The spacers 310 and 312 space adjacent arms 134 away from each other such that the arms can pass between the disks 128. The actuator assembly 132 also includes a yoke 300 which holds the voice coil 130 of the voice coil motor. The yoke includes an opening 303 which also fits over the bearing cartridge 140. Also included are several retainers 330 and 332. The retainers 330 and 332 fit over the top of the bearing cartridge and maintain the actuator assembly 132 in an assembled position. The yoke 300 also serves as a spacer. During assembly, an arm 134 is formed and a suspension 150 is attached to one end of the arm 134. The suspension 150 typically carries the transducer 136. The first arm 134 is placed over the bearing cartridge such that the transducer faces upwardly or can read the bottom surface of one of the disks 128. A spacer 312 is then placed atop the first arm, a subsequent arm is then added to the bearing cartridge. The yoke 300 is then added as are another arm, another spacer 310 and a final arm. The entire assembly is held in place by the retainers 330 and 332. The actuator assembly 132 is usually assembled in a jig which includes an alignment mechanism. Each of the arms 134 includes an opening which can receive a rod or other withdrawable tool that can be used for alignment of the various components of the actuator assembly 132.

Figure 4A:
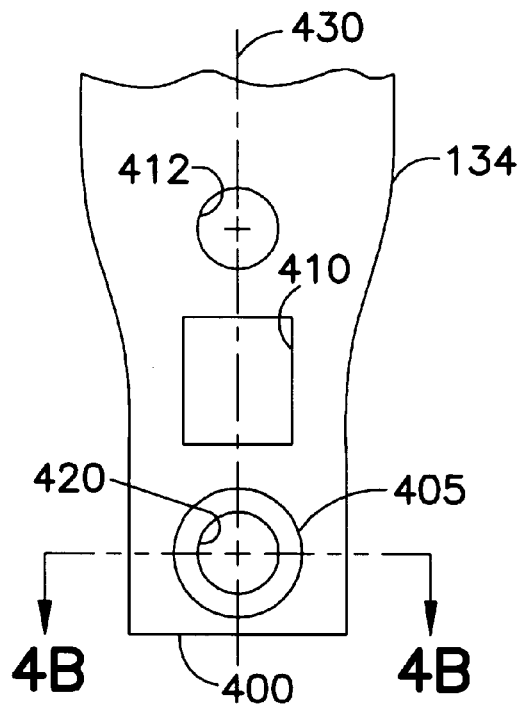
FIG. 4A is a top view of the actuator arm.
Figure 4B:
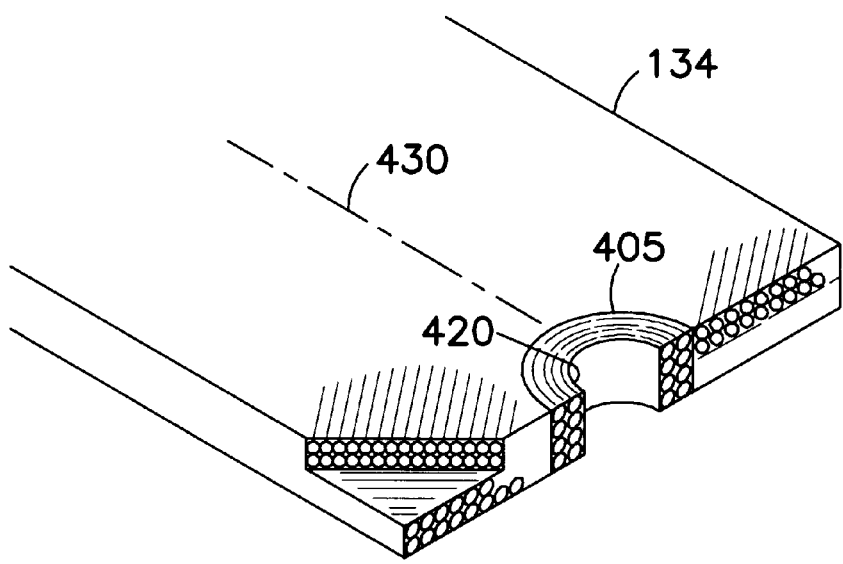
FIG. 4B is a cutaway view showing reinforcing lay-up for a swage opening.

FIG. 4A is a top view of an actuator arm 134. The actuator arm 134 has an opening 305 at one end for attaching to a bearing cartridge (shown in FIG. 3). The other end is a suspension-attach region 400 and includes a swage opening 420 so that a suspension (shown in FIG. 3) can be attached to the arm 134 using a swaging technique. The arm 134 also includes an alignment hole 410 and an alignment hole 412 which accommodate alignment tools from a jig used to form the actuator assembly. The alignment holes 410 and 412 maintain the alignment of the various arms as the actuator assembly is assembled. The use of a swaging technique on a composite arm would require a cylindrical fiber lay-up 405 to handle the radial stress generated from a swage mount as shown in FIG. 4B. A metal insert could be substituted for the cylindrical fiber lay-up 405 that handles the radial stress generated by the swage but the thermal expansion mismatch between the composite and metal could cause temperature cycling problems. The arm 134 also includes a longitudinal axis 430 which is shown in FIG. 4A as a dotted line.

Figure 5A:
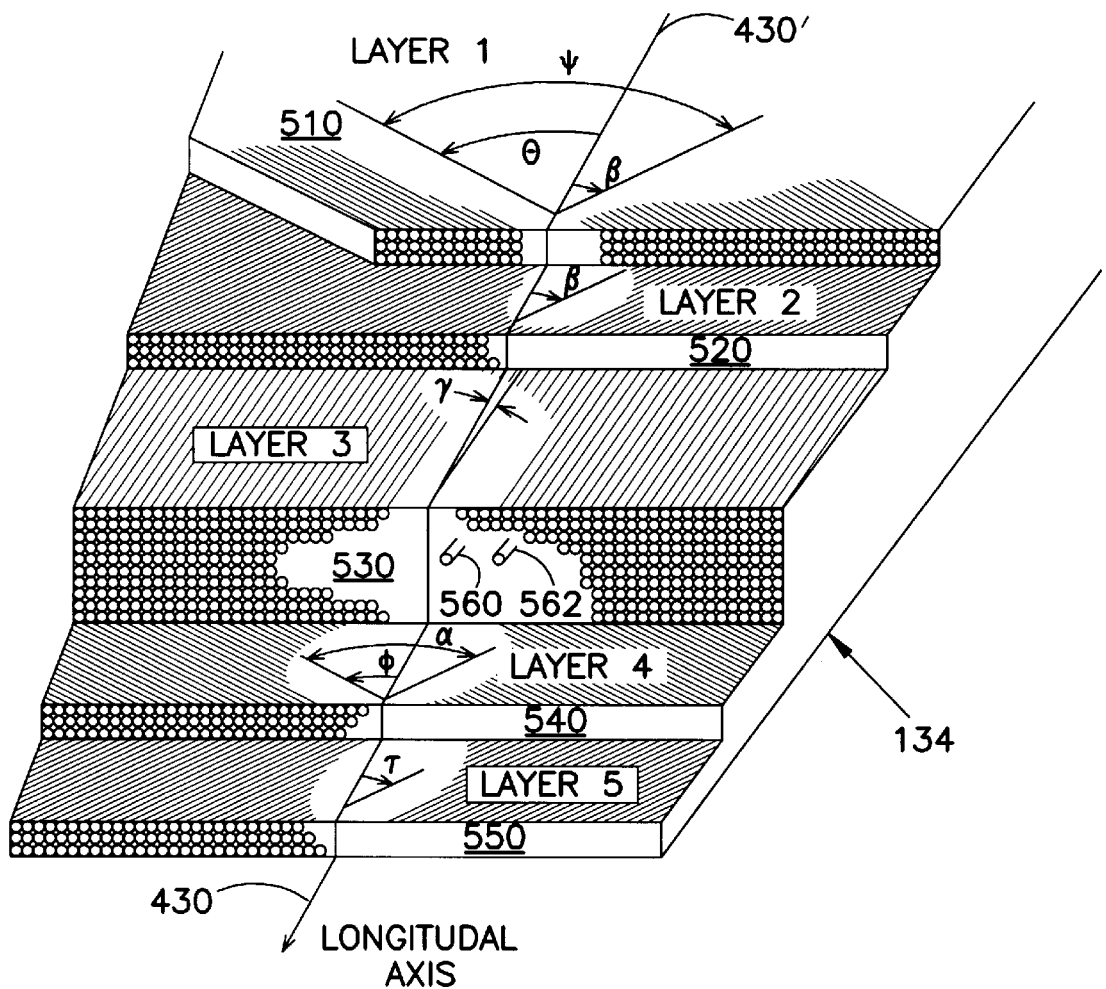
FIG. 5A is a cutaway perspective view of the actuator arm showing the directions of the fibers in the various layers of the arm.

Now turning to FIG. 5A, a cutaway view of the actuator arm 134 showing the various layers of the composite material is shown. The arm 134 is comprised of five layers, 510, 520, 530, 540 and 550 of elongated fibers. The elongated fibers can be of carbon or boron or a similar material which has high tensile strength. Each layer 510, 520, 530, 540 and 550 includes a multiplicity of the elongated fibers placed substantially parallel to one another. The elongated fibers stiffen the arm 134 in one direction and are sometimes referred to as stiffening fibers. This material is available from many sources such as Hexel of San Francisco, Calif. and is commonly referred to by the trade name IM7. The middle layer 530 of the arm 134 is placed so that the elongated fibers within the layer 530 are substantially parallel to the longitudinal axis 430 of the arm 134 ($\gamma$~0). The elongated fibers in the remaining layers 510, 520, 540 and 550 are orientated at specific angles ($\theta$, $\beta$, $\phi$, $\tau$, respectively) both with respect to the longitudinal axis 430 as well as to each other to stiffen the torsional and sway modes of resonance and to also stiffen the bending modes of the arm 134. By varying the various angles shown, the resonant frequency of the arm 134 can be selected. In other words, by varying the various angles, the various resonant modes can be varied to resonate at a different frequency. Layer 510 is laid at an angle $\theta$ with respect to the longitudinal axis 430. As shown in FIG. 5, the longitudinal axis 430 has been also placed on the top of the arm 134 and is labeled as 430'. The longitudinal fibers of the second layer 520 make an angle $\beta$ with respect to the longitudinal axis 430. The elongated fibers in layer 510 make an angle $\psi$ ($\psi \times \theta + \beta$) with respect to the elongated fibers of layer 520. Generally, $\psi$ will be an angle of 90° if maximum strength is wanted between the two layers 510 and 520. However, the angle $\psi$ can be varied to vary the resonance of the actuator arm. Positioned between the layer 520 and the layer 530 are a pair of conductors or electrical signal-carrying wires 560 and 562. Advantageously, the signal-carrying wires 560 and 562 are formed between two layers 520 and 530 so that they do not have to be attached to the exterior portion of the arm 134. The elongated fibers in layer 540 make an angle $\theta$ with respect to the longitudinal axis 430 of the arm 134 and the elongated fibers of layer 550 make an angle $\tau$ with respect to the longitudinal axis 430 of the arm 134. The elongated fibers in layer 540 make an angle $\alpha$ with respect to the elongated fibers in layer 550. Once again, the angle $\alpha$ would be approximately 90° to obtain the maximum amount of strength and stiffness between the layers 540 and 550, however, the angle α can be varied to vary the resonant frequency of the arm 134.

Basically, the angular relationship is computed by initializing θ, β, φ and τ at 45° and γ at 0°. The basic form factor of the arm is then determined from the available space and geometrical requirements of the specific disk drive design. Using the initial angles, and form factor (including tooling holes), the arm is computer modeled and the frequency of the natural resonance modes are calculated and compared to the disk stack resonance frequencies and the head/ suspension resonance frequency. Vibrational modes of the arm that are frequency co-incident to significant vibrational modes of the disk stack or the suspension are then targeted for change. Bending mode frequencies are affected by changing the relative thickness of layer 530 with respect to the other four layers 510, 520, 540, and 550. The bending mode frequency is affected by the number of elongated fibers which are substantially parallel to the longitudinal axis 430 of the arm 134. Torsion or sway modes are affected by the angles θ, β, φ, and τ. Decreasing the angles θ, β, φ, and τ will move the torsion modes down in frequency. Increasing the angles θ, β, φ, and τ will increase the torsion mode frequencies, and lower the frequency of the bending modes. Mode frequency movement must be iterated to obtain an acceptable frequency spectrum. Current computer modeling programs, such as Parametric Technology Corporation's "Mechanica", can be set to obtain a "best fit" for the actuator arm. In other words, the resonant frequencies of the various vibrational modes of the arm can be shifted to the frequency gaps in the combined disk and suspension frequency spectrums as shown and discussed with respect to FIGS. 7, 8 and 9.

Figure 5B:
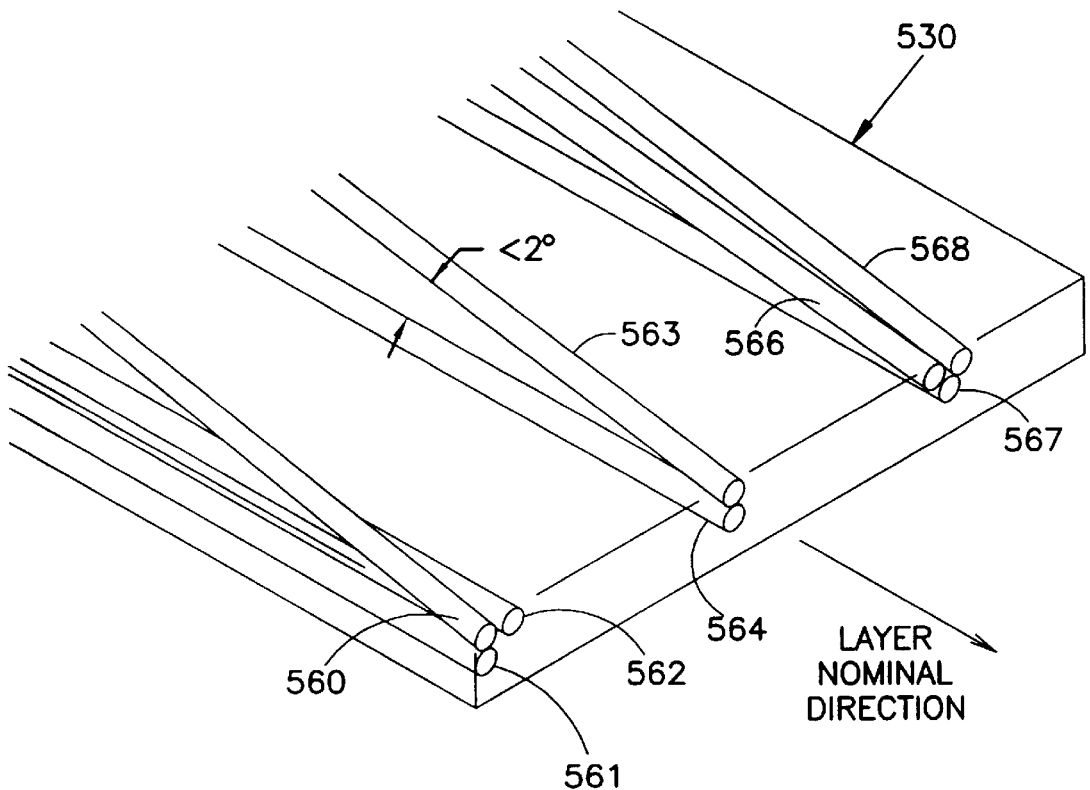
FIG. 5B is a cutaway perspective view of the actuator arm showing the directions of the individual fibers in one of the layers of the arm.

FIG. 5B is a cutaway perspective view showing the individual elongated stiffening fibers in one layer of a composite arm. The layer shown is layer 530. The elongated stiffening fibers are shown in bundles. One bundle is comprised of fibers 560, 561 and 562. A second bundle is comprised of fibers 563 and 564 and the third bundle is comprised of fibers 566, 567 and 568. The elongated stiffening fibers 563 and 564 of the second bundle show a slight angle 580 between adjacent elongated fibers. The slight angle provides for a dampening of the gain associated with resonance in the general direction of the fibers. Thus, in addition to the ability to vary or shift the resonant frequency associated with the arm 134, the gain can be tailored to produce dampening at specific frequencies for optimum actuator disk system performance. The angle 580 between the elongated fibers is generally 3 degrees or less, and preferably 2 degrees or less.

Figure 6:
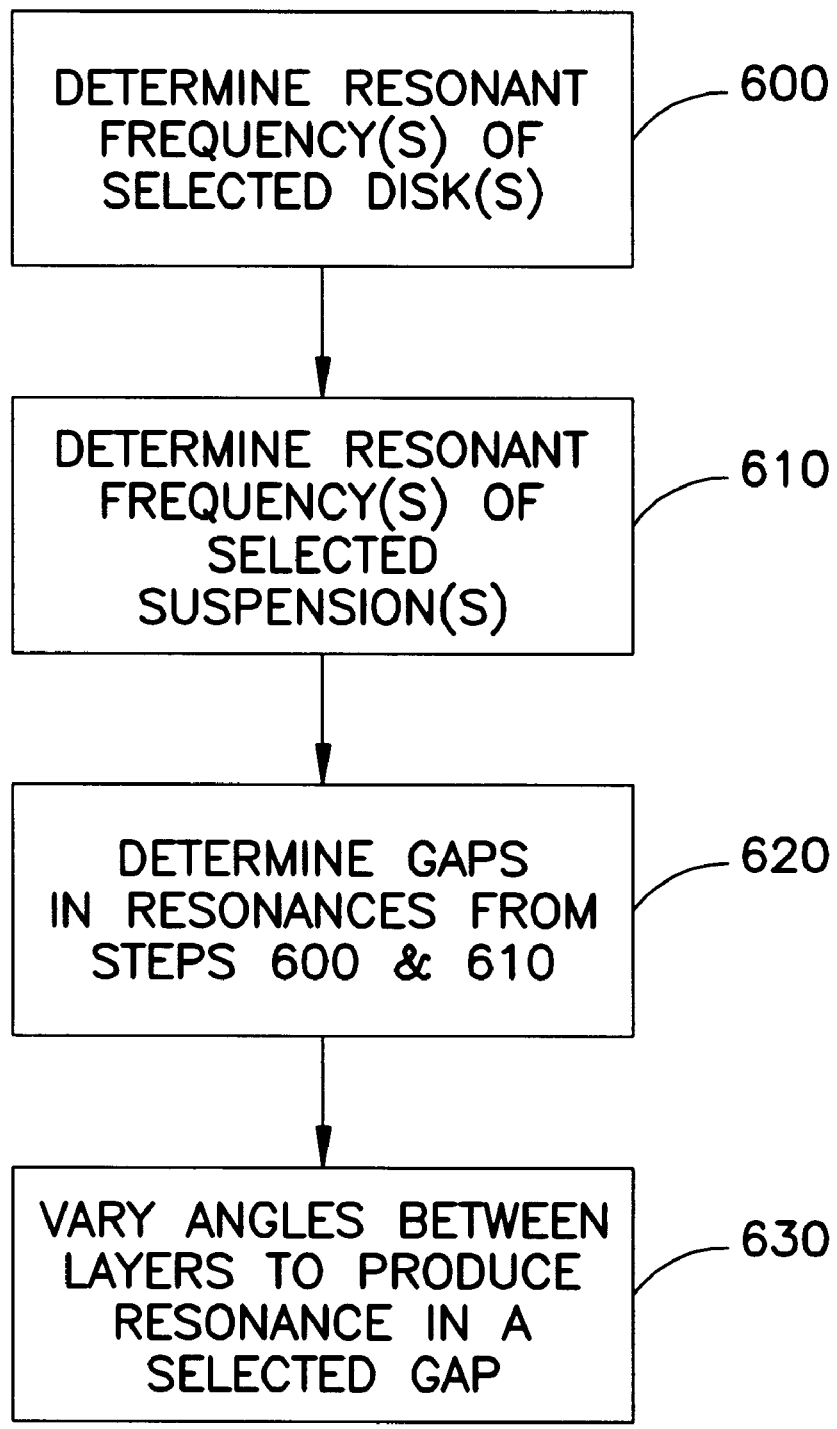
FIG. 6 is a flow diagram illustrating the assembly details of the actuator assembly.

FIG. 6 is a flow diagram which shows the assembly details for determining the angles of the various layers 510, 520, 530, 540 and 550. Once a particular disk has been selected, the frequency response for the various vibrational modes where the disk stack resonates is charted, as depicted by step 600. The resonant frequencies are noted as falling within a particular range.

Figure 7:
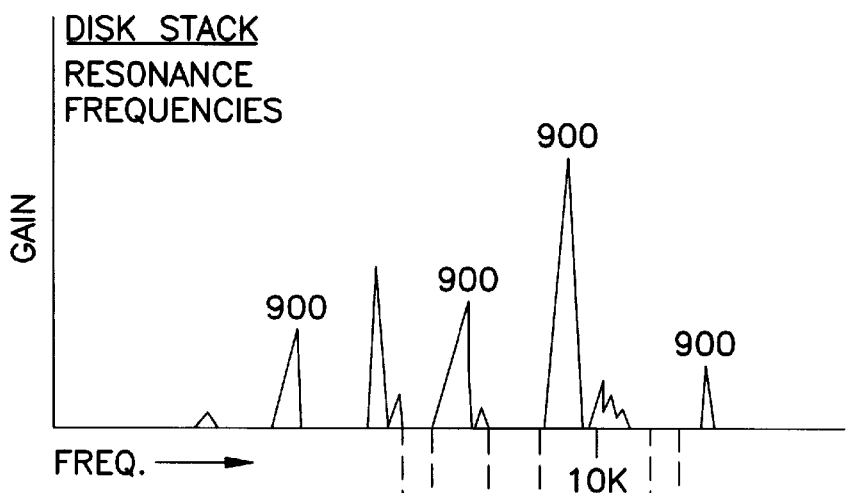
FIG. 7 is a plot showing the frequency response for the disks in a disk drive.

FIG. 7 shows a typical frequency response chart for a disk stack in a disk drive. The disk stack is the entire number of disks as mounted for rotation to the housing of the disk drive. Some disk stacks include just one disk. Other disk stacks include a plurality of disks.

Figure 8:
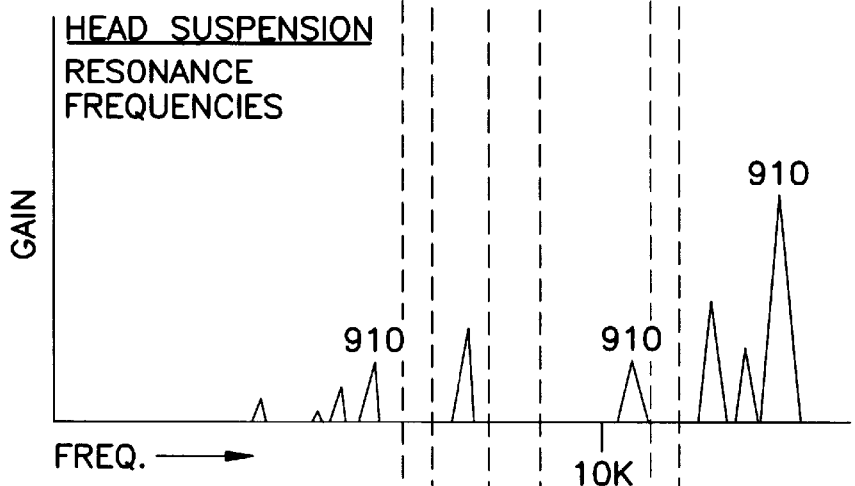
FIG. 8 is a plot showing the frequency response for the head suspension assembly of a disk drive.

The next step 610 is to determine the resonant frequency of the selected suspension or suspensions. This is done by testing the selected head suspension assemblies to produce a frequency response chart for the suspensions of the disk drive as shown in FIG. 8. Typically, this process is continued until the resonant frequency of the major components of the disk drive are determined. For the sake of this particular discussion, the significant resonances are produced by the disk stack of the disk drive as well as the head suspension assembly 150 of the disk drive.

Figure 9:
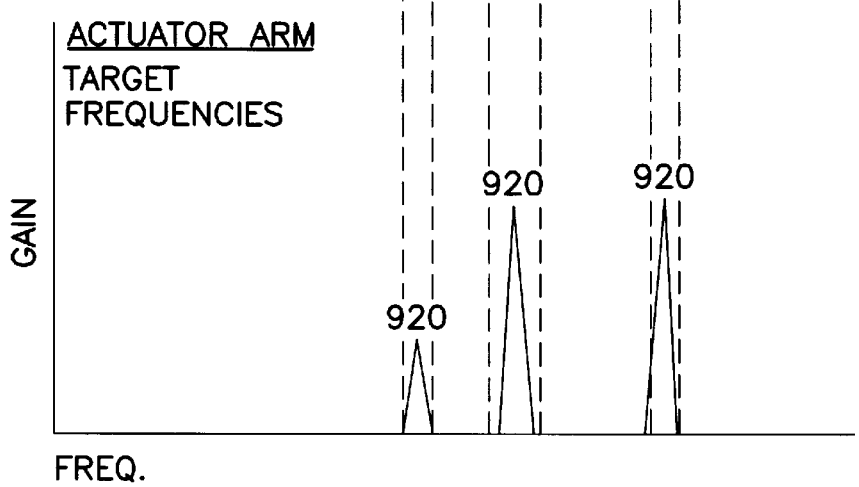
FIG. 9 is a plot showing the target frequency response for a typical composite arm.

Once all the major components have been tested to determine their resonant frequencies, the next step 620 is to determine the gaps in the resonant frequencies of the major components. In other words, the resonant frequencies of all the major components are compiled and compared. There are "dead spots" where there is no resonant frequency of a major component. One way to find the dead spots or gaps is to take the resonant frequency chart of the major components and overlay them to determine where the dead spots or gaps in resonant frequency occur. Another way to find the dead spots or gaps is shown in FIGS. 7, 8 and 9. In FIGS. 7, 8 and 9 as shown in this patent application the frequency is along the X axis in each of the FIGS. 7, 8 and 9. The scale for each of the frequencies in FIGS. 7, 8 and 9 is the same. After determining the resonant frequency of the disk stack as shown in FIG. 7 and the resonant frequencies associated with the head suspension as shown in FIG. 8, vertical lines can then be dropped down that hit the gaps. The vertical lines are shown as dotted lines in FIG. 9. The frequency of the actuator arm for the various modes can then be tuned to fit the gaps. Conversely, the resonant frequency for the various modes of the actuator arm can be projected upwardly to the frequency response charts of FIGS. 8 and 7 to assure that the resonant frequency of the actuator arm is not within or does not overlay the resonant frequency of either the disk stack or the head suspension assembly. The next step is to vary the angles between the layers as well as the angle with respect to the longitudinal axis 430 of the arm 134 to produce an arm that resonates within a gap or within a dead spot. This is depicted as step 630 in FIG. 6. In other words, the angle φ, τ, β and θ can be varied to produce an arm 134 which resonates within a range of frequencies. By varying these angles, the resonant frequency can be shifted or moved to a dead spot or gap in the resonant frequency of the other major components of the disk drive.

It should be noted that the number of layers need not be limited to five as shown in FIG. 5. An actuator arm 134 can have more or less layers than five. Another aspect of this invention is that the fibers within a layer can be slightly offset with respect to one another to provide dampening of any vibrations or resonant frequencies that occur. For example, layer 520 could be formed of component fibers in the layer of the material using elongated fibers. The two component fiber groups in the layer could be slightly angularly offset from one another so that a shallow angle or very small angle is formed between the component elongated fibers in the layer. By forming a slight angle or offset between component fibers in the layer, dampening is the result. Dampening can be used to lessen the magnitude of the gain at resonant frequency or the magnitude of the displacement of the material. This is accomplished by the slight angular difference of the fibers producing a slight twisting action within the layer whenever the layer is deformed. This dissipates the energy of the vibration. Some misorientation occurs naturally during fiber lay-up, but if greater dampening is required, deliberate misorientation during fiber lay-up can be used to reduce the gain of the resonance peaks. All or only selected layers could be deliberately misoriented. Generally, the amount of misorientation is kept at an angle of 2° or less. The angle is the angle between two adjacent or substantially adjacent elongated fibers.

Once the angles α, β, γ, θ, ψ, φ and τ are determined by the process above, the actuator arm 134 can be formed. The arm is fabricated by precisely laying the layers of elongated carbon fibers, such as 510, 520, 530, 540 and 550 at the determined angular relationships with respect to each other. After the layers are laid down, the arm is molded to the shapes, such as shown in FIG. 4. The fibers are then injected with an epoxy or thermoplastic material which is also known as a binder while the arm 134 is molded. The fibers may also be coated with prepreg prior to being laid in their special orientation and fused during the molding operation. If the elongated fibers are made of carbon, an arm is produced that is not only light and stiff, but, unlike ceramic components, will not fracture. The multi-layer carbon fiber composites are resistant to catastrophic failure. Individual fibers may break but the overall structure is quite resistant to fracture propagation. The result is that the composite actuator arm 134 is robust in both manufacturing shock loads as well as operating shock loads. In addition, the low mass and high stiffness of the arm reduce the disk damage effects by limiting the vertical head motion. When carbon is used, the resulting arm is approximately 60% to 80% carbon by volume. The remainder is binder.

The binder can be any of a number of materials including epoxy, aluminum, thermoplastic or any other material used to form the composite structure. The elongated fibers can be also made from something different than carbon. The elongated fibers can be made of silicon carbons with a SiC, BAl, boron, $BAl_2SiO_3$, alumina, or any other continuous filament fiber. These are types of elongated fibers available in the industry. In addition to selecting the elongated fibers for their characteristic stiffness in a particular direction, other criteria may also be used to select certain fibers. For example, if heat will be generated on the arm 134, fibers that are thermally conductive may be selected. In addition, some of the fibers of a particular layer may be substituted with elongated fibers of another material with extremely high thermal conductance. These thermally conductive fibers, such as the graphite KL100 fibers made by the Amoco Corporation of Chicago, Ill. have almost 3 times the thermal conductance of copper and could be interspersed with carbon or interspersed into a layer of carbon or boron-elongated fibers so that heat could be carried away from a certain portion of the arm 134. The resulting composite arm 134 formed would then have a built-in heat sink which could be used to facilitate placing chips directly onto the arm 134. The resulting arm would still be stiff and the resonant frequencies could be varied and, advantageously, the arm would be capable of carrying heat away from a heat source. Other elongated fibers may have other characteristics which are desirable to build in to the composite structure of the arm 134. These other fibers could also be substituted into a layer or layers of the composite arm.

Advantageously, the arm 134 may be formed so that it resonates in the dead spots or resonates where the other major components of a disk drive do not resonate. The angles α, β, γ, θ and τ can be varied to shift the resonant frequency of the arm to a dead spot or gap in the resonant frequencies of the other major components. In addition, the gain can be tailored to produce dampening at specific frequencies to optimize the actuator disk system performance.

The end result is that resonant frequencies will not align and produce a large resonant frequency. In addition, the resonant frequencies can be controlled so that the track density can be increased dramatically. Another advantage is that the resulting material is light weight and yet stiff, so that access times can go down. Access times will also drop as the track density of the disk increases. Yet another advantage is that the signal wires can be varied within the actuator arm 134. There will be no need then to provide separate loops for the signal-carrying wires. Wear of those wires will also be substantially reduced since they are carried by the arm and will not repeatedly rub across metal surfaces as the actuator assembly 132 moves. Yet another advantage of burying the wires within the composite comes from the fact that carbon is a good conductor of electricity. In the past, the signals from one wire would interfere with the signals from another wire, resulting in cross talk. The wires would have to be twisted in order to eliminate cross talk. Since carbon is used as one of the elongated fibers in the composite arm 134, and since carbon conducts electricity, cross talk will be substantially reduced or eliminated, thus negating the need to form twisted pairs of signal-carrying wires and stray RF pickup will be reduced. This is especially useful for digital signal transmission, such as is needed for chip-on-arm mounts.

FIG. 7 is a chart showing the gaps in the frequency response for the disk stack and suspension 150. FIG. 9 shows the frequency response of the composite arm 134 shifted into the gaps in the frequency response for the disk stack and suspension 150. The frequency modes at which the disks 128 resonate are labeled 900, the frequency modes at which the suspension 150 resonates are labeled 910, and the frequency response of the composite arm 134 is labeled 920. Each component has multiple order frequency resonances resulting in several peaks. It is shown here in this figure that the frequency response for the composite arm 134 fits within the gaps or dead spots of the resonant frequencies for both the disks 128 and the suspension 150.

Figure 10A:
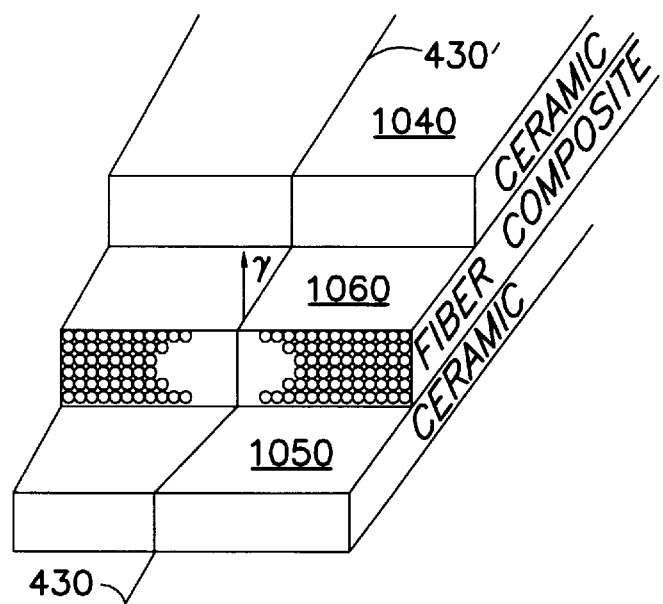
FIG. 10A is a top view of another embodiment of a composite arm.
Figure 10B:
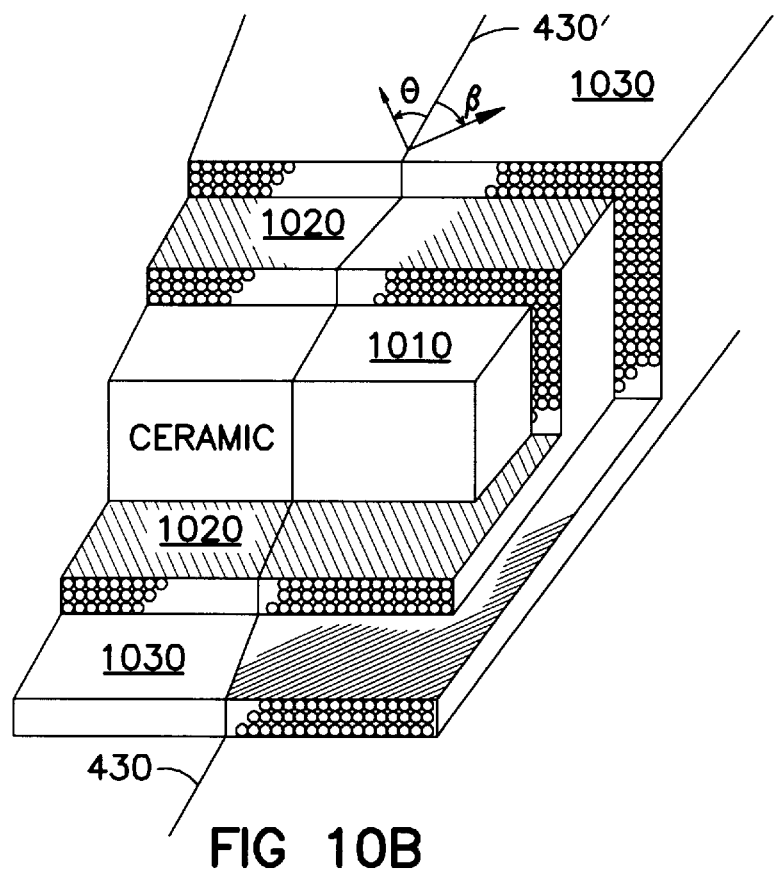
FIG. 10B is cross sectional view of yet another embodiment of a composite arm.

FIGS. 10A and 10B show cross sectional views of other embodiments of the composite arm 1034. The arm 1034 has the same shape as the arm 134. The arm 1034 also has the same tooling holes and attachment holes. FIG. 10A shows an isometric view of an embodiment in which the ceramic layers sandwich the composite material. The ceramic layers are both on the top (1040) and the bottom (1050) of a fiber composite core (1060). $AlB_4C$ is one such ceramic material, made by Dow Chemical Company. This design has excellent bending and torsional characteristics. Another embodiment shown in FIG. 10B shows a ceramic core (1010) with a fiber layer on both sides of the core, or wrapping the core, as shown in FIG. 10B. A first layer of material having elongated fibers 1020 is wrapped around the ceramic core 1010. In addition, a second layer 1030 of material 1030 having elongated fibers is also wrapped around the ceramic core 1010 and the first layer 1020. The elongated fibers in the first layer make an angle (θ+β) with respect to the elongated fibers in the second layer 1030. These arrangements of a core of either ceramic or composite fibers with outer layers of either fiber composite or ceramic layers, respectively, allow further design control of the frequency and interial mass of the actuator arm.

Figure 11:
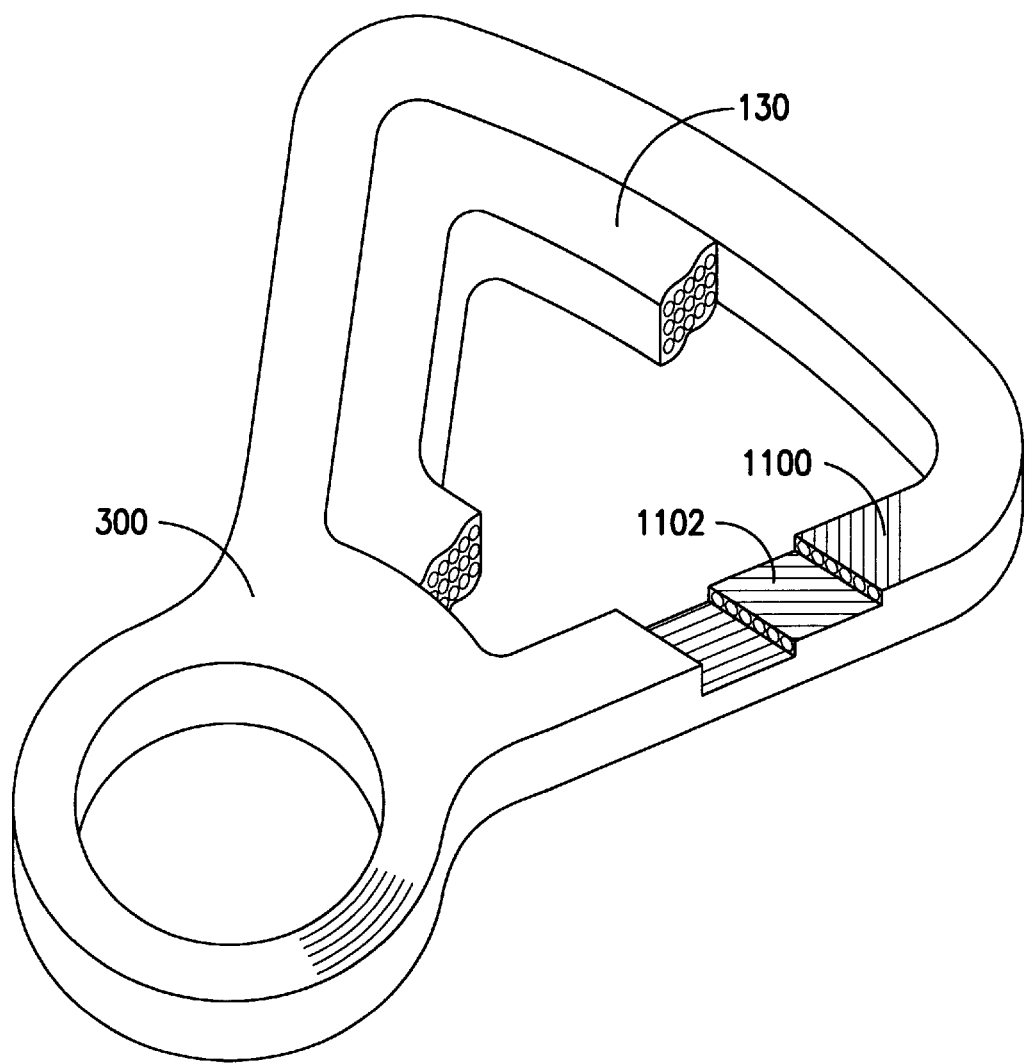
FIG. 11 is an isometric cutaway view of the yoke of an actuator assembly.

FIG. 11 is an isometric cutaway view of the yoke 300 of an actuator assembly. The yoke 300 is formed of a first layer of material 1100 including a plurality of elongated fibers oriented in a first direction and of a second layer of material 1102 including a plurality of elongated fibers oriented in a second direction. The yoke 300 holds the voice coil 130 and includes on opening 303 which fits over the bearing cartridge.

Advantageously, a lower mass actuator arm is produced in which the resonant frequency of the actuator arms can be shifted to a selected resonant frequency. The amplitude of the resonant frequency can also be controlled to higher frequencies than previously possible. Such a light and stiff actuator arm allows for greater track density and increased performance. The lower interial mass allows lower access times to be achievable with this system. Advantageously, the actuator arm is lighter and stiffer such that the resonant frequencies are shifted to the higher end of the frequency spectrum when compared to current steel or metal actuator arms. The stiffness of the arm can also be controlled in various directions so that the resonances can be changed to frequencies other than the resonant frequencies of other components of the disk drive. An additional advantage is that the lighter actuator arm has increased shock resistance. The increased shock resistance yields a more robust drive.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An actuator assembly for a disk drive comprising:
   at least one arm formed of a composite material;
   a suspension attached to said arm;
   a transducer attached to said suspension;
   a yoke; and
   a coil portion of a voice coil motor attached to said yoke wherein said yoke and said at least one arm are formed of:
      a first layer of material including a plurality of elongated fibers oriented in a first direction; and
      a second layer of material including a plurality of elongated fibers oriented in a second direction, wherein said first and second layers are part of the composite material.

2. The actuator assembly of claim 1 wherein an elongated fiber in the second layer makes an angle with an elongated fiber in the first layer.

3. The actuator assembly of claim 2 wherein the angle between an elongated fiber in the second layer and an elongated fiber in the first layer is varied to vary the stiffness of the actuator arm.

4. The actuator assembly of claim 2 wherein the angle between an elongated fiber in the second layer and an elongated fiber in the first layer is varied to vary the resonant frequency of the actuator arm.

5. The actuator assembly of claim 2 wherein the angle between adjacent elongated fibers in one of the first or second layers is slight so as to dampen vibrations that occur along the length of the elongated fibers.

6. The actuator assembly of claim 2 wherein the angle between adjacent elongated fibers in one of the first or second layers is less than 2 degrees so as to dampen vibrations propagating in the elongated fibers.

7. The actuator assembly of claim 2 further comprising a third layer of material including a plurality of elongated fibers orientated in a third direction, said arm having a longitudinal axis wherein the elongated fibers in the third layer are substantially parallel to the longitudinal axis, and wherein the elongated fibers in the second layer and the elongated fibers in the first layer make an angle with respect to the longitudinal axis of the arm.

8. The actuator assembly of claim 7 further comprising additional layers having elongated fibers.

9. The actuator assembly of claim 1 wherein the elongated fibers in the first and second layers are comprised of carbon.

10. The actuator assembly of claim 1 wherein the elongated fibers in the first and second layers are comprised of boron.

11. The actuator assembly of claim 1 wherein the elongated fibers in the first and second layers are comprised of silicon carbon.

12. The actuator assembly of claim 1 wherein the elongated fibers in the first and second layers are comprised of boron carbon.

13. The actuator assembly of claim 1 wherein the elongated fibers in the first and second layers are comprised of aluminum nitrate.

14. The actuator assembly of claim 1 wherein the elongated fibers in the first and second layers are coated with a material.

15. The actuator assembly of claim 14 wherein the elongated fibers in the first and second layers are coated with epoxy.

16. The actuator assembly of claim 14 wherein the elongated fibers in the first and second layers are coated with thermoplastic.

17. The actuator assembly of claim 14 wherein the elongated fibers in the first and second layers are coated with aluminum.

18. The actuator assembly of claim 1 wherein the elongated fibers in the first and second layers are impregnated with a binder to form the composite material.

19. The actuator assembly of claim 1 further comprising;
    a first signal-carrying wire; and
    a second signal-carrying wire, a portion of said first and a portion of said second signal-carrying wire encapsulated within the composite material.

20. The actuator assembly for a disk drive of claim 1 further comprising a bearing cartridge, said at least one arm and said yoke attaching to the bearing cartridge.

21. The actuator assembly of claim 1 wherein the arm further comprises a layer of ceramic material.

22. The actuator assembly of claim 21 wherein the first layer of material, including a plurality of elongated fibers oriented in substantially a first direction, wraps around the edges of the layer of ceramic material.

23. The actuator assembly of claim 21 further comprising a second layer of material including a plurality of elongated fibers oriented in substantially a second direction, said second direction material differing from the first direction, wherein said second layer includes a substantially planar portion.

24. The actuator assembly of claim 23 wherein the second layer of material, including a plurality of elongated fibers oriented in substantially a second direction, encircles the layer of ceramic material.

* * * * *